United States Patent
Hollweg et al.

(10) Patent No.: US 11,411,411 B2
(45) Date of Patent: Aug. 9, 2022

(54) DEVICE AND METHOD FOR BALANCING AN ENERGY STORAGE MODULE

(71) Applicant: Bayerische Motoren Werke Aktiengesellschaft, Munich (DE)

(72) Inventors: Tobias Hollweg, Shenyang (CN); Johannes Kurtz, Rott am Inn (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 347 days.

(21) Appl. No.: 16/693,537

(22) Filed: Nov. 25, 2019

(65) Prior Publication Data
US 2020/0099233 A1    Mar. 26, 2020

Related U.S. Application Data (63) Continuation of application No. PCT/EP2018/067276, filed on Jun. 27, 2018.

(30) Foreign Application Priority Data

Jul. 28, 2017   (DE) ................ 10 2017 213 020.2

(51) Int. Cl.
*H02J 7/00*     (2006.01)
*B60L 50/64*    (2019.01)
(Continued)

(52) U.S. Cl.
CPC ............ *H02J 7/0016* (2013.01); *B60L 50/64* (2019.02); *B60L 58/12* (2019.02); *B60L 58/16* (2019.02);
(Continued)

(58) Field of Classification Search
CPC ...... H02J 7/0013; H02J 7/0014; H02J 7/0016; H02J 7/0024; H02J 7/005; H02J 7/0049;
(Continued)

(56) References Cited

U.S. PATENT DOCUMENTS

2006/0097698 A1   5/2006   Plett
2011/0127960 A1   6/2011   Plett
(Continued)

FOREIGN PATENT DOCUMENTS

GB         2541419 A       2/2017
WO    WO 2017/056732 A1    4/2017

OTHER PUBLICATIONS

International Search Report (PCT/ISA/210) issued in PCT Application No. PCT/EP2018/067276 dated Oct. 9, 2018 with English translation (five (5) pages).
(Continued)

*Primary Examiner* — Richard Isla
*Assistant Examiner* — Mohammed J Sharief
(74) *Attorney, Agent, or Firm* — Crowell & Moring LLP (57) ABSTRACT

A device balances an energy storage module having multiple energy storage cells connected in series. The device includes: an interface for communication with a monitoring electronics system of the energy storage module; a charge determining device for determining a relative electrical charge quantity based on respective cell voltages and a respective resting voltage characteristic curve for each energy storage cell; a balancing requirement calculation unit for determining a respective relative balancing requirement by forming a difference between the relative electrical charge quantity of a respective energy storage cell and the relative electrical charge quantity of the energy storage cell for which the lowest relative electrical charge quantity was determined, for every energy storage cell with the exception of the energy storage cell for which the lowest relative electrical charge quantity was determined, and for determining an absolute balancing requirement for each energy storage cell; a discharging circuit which is configured to be connected to the energy storage module in such a way that
(Continued)

a respective energy storage cell can be separately discharged by the discharging circuit; and a control device that can control the discharging circuit in such a way that the respective determined absolute balancing requirement can be removed from the respective energy storage cells.

14 Claims, 5 Drawing Sheets

(51) Int. Cl.
*B60L 58/22* (2019.01)
*B60L 58/12* (2019.01)
*B60L 58/16* (2019.01)
*H01M 10/42* (2006.01)
*H01M 10/44* (2006.01)
*H01M 10/48* (2006.01)

(52) U.S. Cl.
CPC ........... *B60L 58/22* (2019.02); *H01M 10/425* (2013.01); *H01M 10/441* (2013.01); *H01M 10/482* (2013.01); *H02J 7/005* (2020.01); *H02J 7/0049* (2020.01); *H01M 2010/4271* (2013.01); *H01M 2220/20* (2013.01)

(58) Field of Classification Search
CPC ........ H02J 7/0048; B60L 50/64; B60L 58/22; B60L 58/12; B60L 58/16; H01M 10/425; H01M 10/441; H01M 10/482; H01M 2010/4271; H01M 2220/20; Y02E 60/10; Y02T 10/70
USPC .......................................... 320/118, 134, 136
See application file for complete search history.

(56) References Cited

U.S. PATENT DOCUMENTS

| 2011/0313613 | A1 | 12/2011 | Kawahara et al. |
| 2014/0042973 | A1 | 2/2014 | Kawahara et al. |
| 2015/0211212 | A1* | 7/2015 | Takeo ................... B60L 58/22 414/694 |
| 2015/0303728 | A1* | 10/2015 | Miura ................. H01M 10/425 320/119 |
| 2016/0089994 | A1* | 3/2016 | Keller ............... H02J 7/007182 320/153 |
| 2016/0218525 | A1 | 7/2016 | Takao |
| 2017/0141588 | A1* | 5/2017 | Kim ...................... H02J 7/0014 |
| 2018/0366959 | A1* | 12/2018 | Coenen ................ H02J 7/0029 |

OTHER PUBLICATIONS

German-language Written Opinion (PCT/ISA/237) issued in PCT Application No. PCT/EP2018/067276 dated Oct. 9, 2018 (nine (9) pages).

German-language Office Action issued in counterpart German Application No. 10 2017 213 020.2 dated Feb. 19, 2018 (10 pages).

Chatzinikolaou et al., "Cell SoC Balancing Using a Cascaded Full-Bridge Multilevel Converter in Battery Energy Storage Systems," IEEE Transactions on Industrial Electronics, Sep. 2016, pp. 5394-5402, vol. 63, No. 9 (nine (9) pages).

Chun et al., "State-of-Charge and Remaining Charge Estimation of Series-Connected Lithium-Ion Batteries for Cell Balancing Scheme," 2015 IEEE International Telecommunications Energy Conference (INTELEC), 2015, Osaka (five (5) pages).

* cited by examiner

DEVICE AND METHOD FOR BALANCING AN ENERGY STORAGE MODULE

CROSS REFERENCE TO RELATED APPLICATIONS

This application is a continuation of PCT International Application No. PCT/EP2018/067276, filed Jun. 27, 2018, which claims priority under 35 U.S.C. § 119 from German Patent Application No. 10 2017 213 020.2, filed Jul. 28, 2017, the entire disclosures of which are herein expressly incorporated by reference.

BACKGROUND AND SUMMARY OF THE INVENTION

The present invention relates to a device for balancing an energy storage module that has a plurality of series-connected energy storage cells, and to a corresponding method for balancing the energy storage module. The present invention furthermore relates to a motor vehicle, in particular an electric vehicle or hybrid vehicle, that comprises an energy storage module and a device for balancing the energy storage module.

Electric vehicles or hybrid vehicles are equipped with an energy storage module, such as for instance a high-voltage store, that stores the electrical energy required to drive an electric drive motor and provides this to the electric drive motor. The high-voltage store comprises a multiplicity of energy storage cells that are designed for example as lithium-ion cells or lithium-ion accumulator cells and that are able for example to be connected in series.

To charge the energy storage module with a series connection of the energy storage cells, the series-connected energy storage cells are supplied with electrical energy externally through connection to a corresponding current or voltage source. In this case, in order to avoid damage to the energy storage module caused by an overvoltage, the charging is limited by monitoring a respective energy storage cell voltage and a corresponding charge controller such that none of the energy storage cell voltages are greater than a predefined upper voltage threshold value. Furthermore, in order to avoid deep discharging of the energy storage cells, the respective energy storage cell voltages are also monitored during discharging of the energy storage module, for example in order to supply electrical energy to an electrical consumer such as for instance the electric drive motor, and the charging process is limited by a corresponding controller such that none of the energy storage cell voltages are less than a predefined lower voltage threshold value.

The maximum usable overall energy of the energy storage module is accordingly determined by that energy storage cell whose voltage, in the charging and discharging case, is the first to reach the upper voltage threshold value, respectively the lower voltage threshold value. In the charging case, the energy storage cell with the highest energy storage cell voltage is the first to reach the upper voltage threshold value, and thus limits the charging of all of the energy storage cells due to the series connection.

A respective energy storage cell voltage is formed, in the loaded state, that is to say the main response current of the energy storage cell is not equal to zero, from a respective quiescent voltage of the energy storage cell and a respective bias overvoltage of the respective energy storage cell. The quiescent voltage is directly connected to a state of charge of the energy storage cell that is able to be determined in many known ways and is normally given as a percentage with respect to the maximum usable overall charge. The bias overvoltage is largely dependent on an energy storage cell impedance and the charge current used for charging and is added to the quiescent voltage in the charging case. These voltage components thereby likewise limit the charging of an energy storage cell. In the discharging case, the bias overvoltage reduces the quiescent voltage of the energy storage cell. These voltage components thereby likewise limit the discharging of an energy storage cell.

In order to increase the maximum usable overall energy of the energy storage module, the energy storage module may be balanced. In this case, an energy storage module is normally considered to be balanced as soon as the state of charge of all of the energy storage cells has the same value at a time of complete cycling. This is referred to hereinafter as meeting the balancing condition from the prior art.

In the balancing according to the prior art, a corresponding balancing apparatus is used to equalize the states of charge of the individual energy storage cells by discharging individual energy storage cells by way of a respective resistor that is connected in parallel with a respective energy storage cell, or by way of charge transfers between individual energy storage cells, or by way of charge transfers between individual energy storage cells and the overall energy storage module, or between individual energy storage cells and external electrical energy stores.

In the first case, the individual energy storage cells are discharged from a quiescent state of the energy storage module in which the individual energy storage cell voltages are relaxed. In the case of normal balancing of an energy storage module, each of the energy storage cells, except for the energy storage cell having the lowest quiescent voltage, is thus in particular discharged until it has the voltage level of the energy storage cell having the lowest energy storage cell voltage. An impedance of an energy storage cell is not taken into consideration in conventional balancing concepts.

A CCCV (constant current constant voltage) charging process is conventionally used to charge an energy storage module containing series-connected lithium-ion energy storage cells. This CCCV charging process comprises sequentially running through a first CC (constant current) phase and a subsequent CV (constant voltage) phase. In the CC phase, the charge current is initially kept constant until an energy storage cell in the energy storage module reaches the upper voltage threshold value. There is then a change to the CV phase in which the upper voltage threshold value is maintained and the charge current accordingly subsides exponentially. This CV phase, and therefore the entire charging process, is interrupted as soon as the charge current drops below a limit value.

With regard to the stored amount of charge after the charging process into the energy storage module has ended, an optimum is achieved here, but in this case, with the exception of taking into consideration the highest energy storage cell voltage that limits the charging process, there is no optimization of the voltage situations of the individual energy storage cells. A variation of the energy storage cell impedance, which may arise inter alia from the production differences of the energy storage cells, the aging mechanisms, the mixed composition of identical energy storage cell chemistries and the mixed composition of different energy storage cell chemistries, is not taken into consideration.

Figure 1:
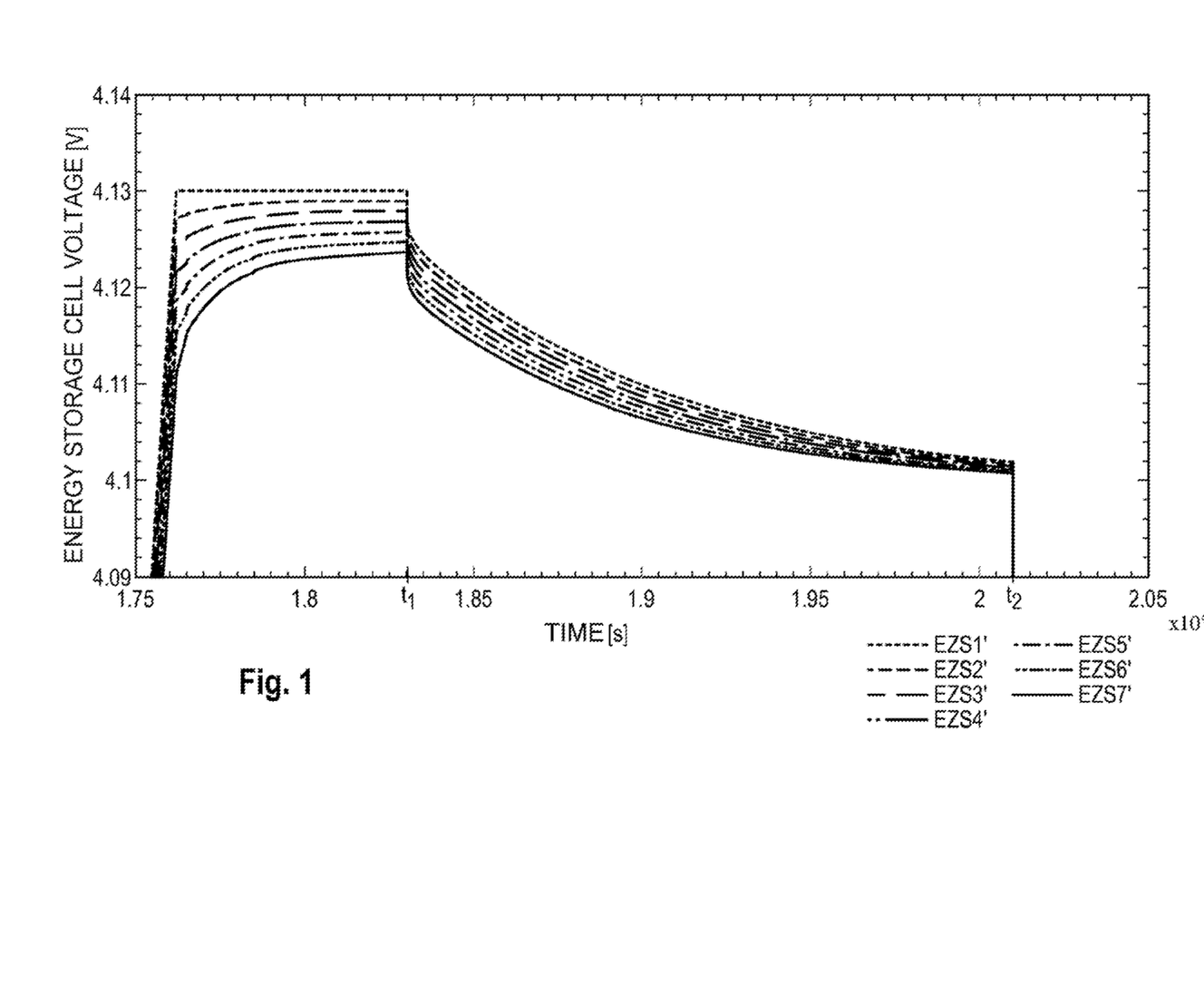
FIG. 1 shows a temporal profile of voltages of respective energy storage cells of an energy storage module that has been balanced by way of a conventional balancing method, during a charging process and subsequent relaxation.

FIG. 1 illustrates a temporal profile of energy storage cell voltages EZS1', EZS2', . . . , EZS7' of a series connection of seven energy storage cells having a different energy cell impedance during a CCCV charging process and subsequent relaxation. In order to guarantee comparability, the energy storage cells, whose energy storage cell voltages EZS1', EZS2', ..., EZS7' are shown as a function of time in FIG. 1, all have an identical capacity. As is apparent from FIG. 1, the energy storage cell having the energy storage cell voltage EZS1' that has the highest energy storage cell impedance restricts the charging process for all of the energy storage cells that are arranged in the series connection. For this reason, the energy storage cells associated with the energy storage cell voltages EZS2' to EZS7', when the charging process ends at the time $t_1$, do not have the highest possible voltage level of the upper voltage threshold value, which only the energy storage cell having the energy storage cell voltage EZS1' illustrated in FIG. 1 reaches. As a result, the energy storage module, at the end of the CCCV charging, does not reach the maximum energy storage module voltage, which is given by the sum of the individual energy storage cell voltages. FIG. 1 furthermore illustrates the relaxation of the energy storage cell voltages EZS1' to EZS7' after the CCCV charging is interrupted, which voltages become closer to one another with increasing time and are virtually identical at the time $t_2$. This explains that the balancing condition from the prior art is met for this energy storage module after the CCCV charging process ends.

An energy storage module having a series connection of energy storage cells is thus not able to store the maximum possible amount of energy, since this energy is defined as the product of current and voltage over the time integral. Using the conventional balancing and the conventional charging process, the energy storage module is thus not completely charged in terms of energy optimization.

One object of the present invention is to provide a device and a method for balancing an energy storage module, by way of which device and method the energy storage module is able to be put into a state in which the energy storage module is able to be charged using a subsequent conventional charging process such that a higher amount of energy is stored in the energy storage module.

According to one embodiment, a device for balancing an energy storage module that has a plurality of series-connected energy storage cells has an interface that is configured so as to communicate with monitoring electronics of the energy storage module, wherein the interface is configured so as to communicate with a voltage recording apparatus of the monitoring electronics in order to receive information about a respective energy storage cell voltage of each of the energy storage cells from the voltage recording apparatus, and the interface is configured so as to communicate with the voltage recording apparatus and a current recording apparatus of the monitoring electronics in order to receive information about regular ending of charging of the energy storage module. The device furthermore comprises a charge determination apparatus that is configured, following reception of the information about the regular ending of the charging of the energy storage module, to determine a relative amount of electric charge for each energy storage cell on the basis of the information about a respective energy storage cell voltage of each of the energy storage cells following the regular ending of the charging of the energy storage module and a characteristic curve that gives a state of charge of the respective energy storage cell depending on a quiescent voltage of the respective energy storage cell, a balancing requirement calculation unit that is configured, for each energy storage cell except for the energy storage cell for which the lowest relative amount of electric charge was calculated, so as to determine a respective relative balancing requirement by calculating a difference between the relative amount of electric charge of a respective energy storage cell and the relative amount of electric charge of the energy storage cell for which the lowest relative amount of electric charge was determined and, on the basis of the respective relative balancing requirement and a respective capacity of each of the energy storage cells, to determine a respective absolute balancing requirement for each energy storage cell except for the energy storage cell for which the lowest relative amount of electric charge was determined, a discharge circuit that is configured so as to be connected to the energy storage module such that a respective energy storage cell is able to be discharged separately by way of the discharge circuit, and a control apparatus that is configured so as to activate the discharge circuit such that the respective determined absolute balancing requirement is drawn from each energy storage cell except for the energy storage cell for which the lowest relative amount of electric charge was calculated.

The device according to the invention may in particular be provided in order to calculate, following the completion of a CCCV charging process of an energy storage module, the balancing requirement of the energy storage module that is appropriate for changing the state of charge of the respective energy storage cells by connecting balancing resistors in parallel such that the energy storage module is put into an energy-optimized balance. An energy-optimized balance of the energy storage module corresponds to a state in which the energy storage cell voltages of the respective energy storage cells all have the upper voltage threshold value at the end of a CCCV charging process. In this case, the balancing requirement may be implemented at any time following the completion of the calculation and before an energy-optimized CCCV charging operation. By virtue of reaching the upper voltage threshold value of all of the energy storage cells at the completion of the CCCV charging process, the overall voltage of the energy storage module at the completion of the CCCV charging process is able to be increased. In the case of subsequent discharging of the identical amount of charge, a higher amount of energy is therefore able to be drawn from the energy storage module in comparison with the balancing condition from the prior art.

In particular, when using the device according to the invention it is not necessary to wait, as in the case of conventional balancing methods, until the energy storage cell voltages have relaxed before the balancing requirement is able to be determined.

Furthermore, by virtue of using the balancing device according to the invention when calculating the absolute balancing requirement, the individual cell impedances of the energy storage cells, which may vary on account of production control, different aging mechanisms, the mixed composition of identical energy storage cell chemistries and the mixed composition of different energy storage cell chemistries for different energy storage cells of the energy storage module, are taken into consideration. Following the corresponding balancing of the energy storage module and subsequent charging, a higher amount of energy is therefore able to be stored in the energy storage module than in the case of using the corresponding conventional methods.

The balancing requirement is also calculated using the device according to the invention without prior knowledge about further properties of the energy storage cell or stored cell model and does not require any access to volatile estimated variables of the energy storage cell state, such as for instance the state of charge.

It is furthermore not necessary to wait for a quiescent state of the energy storage module in order to calculate the respective absolute balancing requirement. Rather, the calculation both of the respective relative balancing requirement and of the absolute balancing requirement may take place directly following the end of the charging process of the energy storage module. It is thus not necessary to wait for any relaxation phases in comparison with the use of conventional devices for balancing an energy storage module or conventional balancing methods.

The charge determination apparatus may be configured so as to define that value of the state of charge that is associated with the respective energy storage cell voltage in the characteristic curve as respective relative amount of electric charge of a respective energy storage cell, and to determine the respective absolute balancing requirement by multiplying the respective determined relative balancing requirement by the respective capacity.

The respective determined relative amount of electric charge, which is given for example as a percentage, thus corresponds to a fictional state of charge that the respective energy storage cell would have if its quiescent voltage were to be the same as the energy storage cell voltage measured or recorded in the loaded state, which is the sum of the quiescent voltage and of the dynamic voltage or bias overvoltage. In this case, the respective relative balancing requirement, which is likewise given as a percentage, may be determined by first of all determining the energy storage cell that has the lowest relative amount of charge and then calculating the difference, for each energy storage cell except for the energy storage cell for which the lowest relative amount of electric charge was determined, between the respective determined relative amount of electric charge and the relative amount of electric charge of the energy storage cell that has the lowest relative amount of charge. The absolute balancing requirement of each energy storage cell may then be determined by multiplying the respective calculated difference by a predefined electrical capacity of the respective energy storage cell.

The interface is preferably configured so as to communicate with a state of health determination apparatus of the monitoring electronics in order to receive information about a respective state of health of a respective energy storage cell from the state of health determination apparatus, wherein the balancing requirement calculation unit is configured so as to calculate the capacity of a respective energy storage cell on the basis of the information about the state of health of the respective energy storage cell and a nominal capacity of the respective energy storage cell.

The state of health determination apparatus may for example determine a respective state of health of the energy storage cell, which may likewise be given as a percentage, as the respective state of health and transmit the information about the respective state of health to the device for balancing the energy storage module. The balancing requirement calculation unit may then calculate the current capacity of the respective energy storage cell by multiplying the respective state of health by a predefined nominal capacity of the respective energy storage cell.

The device for balancing an energy storage module may furthermore comprise a storage apparatus in which the characteristic curve that gives the state of charge of the respective energy storage cell depending on the quiescent voltage of the respective energy storage cell is stored.

In this case, a plurality of different characteristic curves that each give the state of charge of the respective energy storage cell depending on the quiescent voltage of the respective energy storage cell for different states of health of the respective energy storage cell are preferably stored in the storage apparatus, wherein the charge determination apparatus is configured so as to determine the respective relative amount of electric charge on the basis of the information about the respective energy storage cell voltage of each of the energy storage cells following the regular ending of the charging of the energy storage module and that characteristic curve that corresponds to the respective state of health.

In the device for balancing an energy storage module, the discharge circuit preferably has a plurality of resistors and a plurality of switches and is configured so as to be connected to the energy storage module such that a respective resistor and a respective switch that are connected in series are connected in parallel with a respective energy storage cell, wherein the device furthermore has a calculation unit that is configured so as to calculate a respective switching closure time for a respective energy storage cell on the basis of the respective determined absolute balancing requirement, which switching closure time is necessary to draw the respective determined absolute balancing requirement from the respective energy storage cell when the switch is closed, and the control apparatus is configured so as to activate the respective switches according to the calculated switching closure time. The switching closure time may in particular be calculated in this case on the basis of the respective determined absolute balancing requirement, the respective energy storage cell voltage and an impedance of the respective resistor.

A motor vehicle, in particular an electric vehicle or hybrid vehicle according to one embodiment comprises an energy storage module that has a plurality of series-connected energy storage cells and monitoring electronics, and a device described above for balancing an energy storage module.

According to one embodiment, a method for balancing an energy storage module that has a plurality of series-connected energy storage cells comprises recording a respective energy storage cell voltage of each of the energy storage cells, recording a respective capacity of each of the energy storage cells, determining regular ending of charging of the energy storage module, determining a respective relative amount of electric charge for each energy storage cell on the basis of the recorded respective energy storage cell voltages of each of the energy storage cells following the regular ending of the charging of the energy storage module and a characteristic curve that gives a state of charge of the respective energy storage cell depending on a quiescent voltage of the respective energy storage cell, determining a respective relative balancing requirement by calculating a difference between the relative amount of electric charge of a respective energy storage cell and the relative amount of electric charge of the energy storage cell for which the lowest relative amount of electric charge was determined, for each energy storage cell except for the energy storage cell for which the lowest relative amount of electric charge was determined, determining a respective absolute balancing requirement on the basis of the respective relative balancing requirement and the respective capacity of each of the energy storage cells for each energy storage cell except for the energy storage cell for which the lowest relative amount of electric charge was determined, and discharging the energy storage module such that the respective determined absolute balancing requirement is drawn from each energy storage cell except for the energy storage cell for which the lowest amount of electric charge was determined.

That value of the state of charge that is associated with the respective energy storage cell voltage in the characteristic curve is preferably defined as respective relative amount of charge of a respective energy storage cell, wherein the respective absolute balancing requirement is determined by multiplying the respective determined relative balancing requirement by the respective capacity.

The method may furthermore comprise recording a respective state of health of a respective energy storage cell, and calculating the capacity of a respective energy storage cell on the basis of the respective state of health of the respective energy storage cell and a nominal capacity of the respective energy storage cell.

The method may furthermore comprise acquiring the characteristic curve that gives the state of charge of the respective energy storage cell depending on the quiescent voltage of the respective energy storage cell, and storing the acquired characteristic curve in the storage apparatus.

According to one embodiment, a plurality of different characteristic curves that each give the state of charge of the respective energy storage cell depending on the quiescent voltage of the respective energy storage cell for different states of health of the respective energy storage cell are stored in the storage apparatus, wherein the respective relative amount of electric charge is determined on the basis of the respective energy storage cell voltage of each of the energy storage cells following the regular ending of the charging of the energy storage module and that characteristic curve that corresponds to the respective state of health.

The method for balancing an energy storage module preferably furthermore comprises providing a discharge circuit that has a plurality of resistors and a plurality of switches, connecting the discharge circuit to the energy storage module such that a respective resistor and a respective switch that are connected in series are connected in parallel with a respective energy storage cell, calculating a respective switching closure time for a respective energy storage cell on the basis of the respective determined absolute balancing requirement, which switching closure time is necessary to draw the respective determined absolute balancing requirement from the respective energy storage cell when the switch is closed, and activating the respective switches according to the calculated switching closure time.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 2:
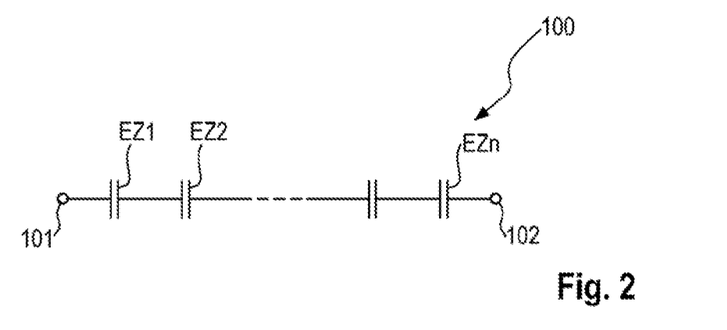
FIG. 2 schematically shows a structure of an energy storage module that is able to be balanced by way of a balancing apparatus according to the invention.

FIG. 2 schematically shows a structure of an energy storage module 100 that is able to be used to supply electrical energy to an electrical consumer and that is able to be balanced by way of a balancing apparatus according to the invention. The energy storage module 100, which may be designed as a high-voltage store that is configured so as to store electrical energy to drive an electric drive motor of an electric or hybrid vehicle, has an electrical plus pole 101 and an electrical minus pole 102 in order to provide the stored electrical energy to the electrical consumer, such as for instance the electric drive motor in order to drive same. The energy storage module 100 furthermore has a plurality of energy storage cells EZ1, EZ2, . . . , EZn that are connected in series. The energy storage cells EZ1, EZ2, . . . , EZn are preferably designed as accumulator cells, for example as lithium-ion accumulator cells.

Monitoring electronics, not shown, of the energy storage module 100 that are connected to the energy storage module 100 have a voltage recording apparatus that is configured so as to separately and continuously record a respective energy storage cell voltage of each of the energy storage cells EZ1, EZ2, . . . , EZn.

A charge controller, not shown, which has a terminal for supplying electrical energy that is used to charge the energy storage module 100, is connected in order to charge the energy storage module 100. The charge controller is configured so as to control the charging process of the energy storage module 100.

During the charging, in particular corresponding terminals, not shown, of the charge controller may be connected to the electrical plus pole 101 and the electrical minus pole 102 of the energy storage module 100 or other terminals of the energy storage module that are provided specifically for the charging process. In this case, the charge current is measured by way of a current measurement apparatus, not shown, of the charge controller and controlled using a CCCV charging method by way of a current control apparatus, not shown. Furthermore, during the CCCV charging process, the charge current is kept at the maximum permissible value by way of a charge current control apparatus, not shown, in the CC phase until an energy storage cell in the energy storage module reaches the upper voltage threshold value. There is then a change to the CV phase, in which the upper voltage threshold value of the energy storage cell is maintained and the charge current is accordingly reduced by way of a charge current control apparatus, not shown. This phase, and therefore the overall charging process, is interrupted as soon as the subsiding charge current falls below a limit value.

The monitoring electronics of the energy storage module 100 have a current recording apparatus in addition to the voltage recording apparatus, both of these being configured so as to record a full state of charge of the energy storage module 100 and to end a charging process of the charge controller.

The monitoring electronics of the energy storage module 100 furthermore have a state of health determination apparatus that determines a dimensionless state of health value on the basis of different operating data of the individual energy storage cells EZ1, EZ2, . . . , EZn that are likewise monitored by the monitoring electronics of the energy storage module 100, which state of health value is given as a percentage and gives a ratio of a current state of health of the respective energy storage cell EZ1, EZ2, ..., EZn to an ideal state of health. In this case, the state of health value may in particular give a ratio of the current capacity of the energy storage cell EZ1, EZ2, ..., EZn to an ideal capacity or nominal capacity. The current capacity of each of the energy storage cells EZ1, EZ2, ..., EZn is therefore able to be determined using the ideal capacity value.

Figure 3:
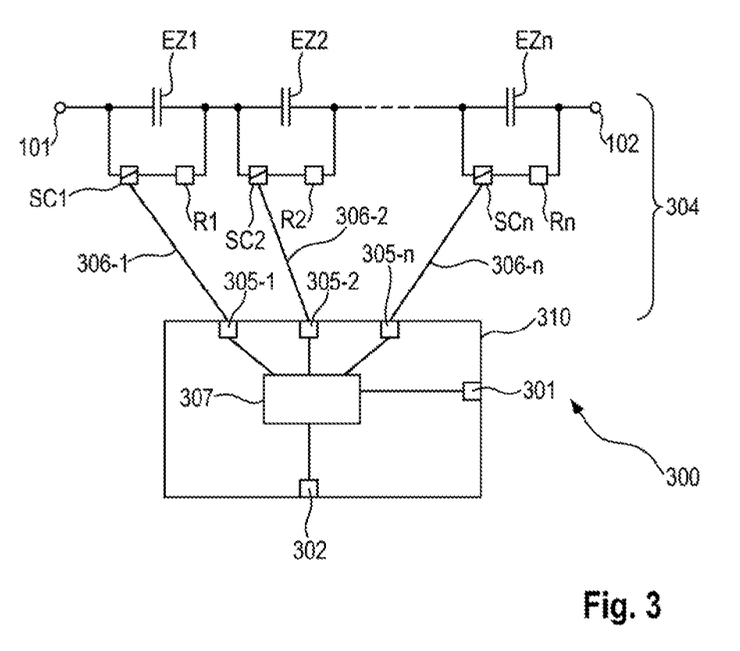
FIG. 3 schematically shows a structure of a balancing device according to the invention together with the energy storage module shown in FIG. 2.

FIG. 3 schematically shows a device 300 according to the invention for balancing an energy storage module that is connected to the energy storage module 100 illustrated in FIG. 2.

The device 300 has a housing 310 having an interface 301 that is configured so as to communicate with the monitoring electronics of the energy storage module 100 via an electrical line, not shown, or wirelessly. The device 300 further has a storage apparatus 302, a discharge circuit 304 and a control unit 307 that is connected to the interface 301, the storage apparatus 302 and the discharge circuit 304 via respective electrical communication lines that are illustrated in the figure.

The interface 301 is configured so as to receive information about a respective energy storage cell voltage EZS1, EZS2, ..., EZSn of each of the energy storage cells EZ1, EZ2, ..., EZn separately from the voltage recording apparatus of the monitoring electronics. The interface 301 is furthermore configured so as to receive information about ending of charging of the energy storage module 100 from the voltage recording apparatus and the current recording apparatus of the monitoring electronics. The information about the ending of the charging in particular contains information about whether or not the subsiding charge current dropped below the limit value in the CV phase during the charging using the CCCV method and the charging was thus ended regularly.

The interface 301 is furthermore configured so as to receive information about the state of health of the energy storage module 100 from the state of health determination apparatus of the monitoring electronics.

The storage apparatus 302 is configured so as to store a characteristic curve that gives a state of charge of a respective energy storage cell EZ1, EZ2, ..., EZn depending on a quiescent voltage of the respective energy storage cell EZ1, EZ2, ..., EZn.

The discharge circuit 304 has a plurality of terminals 305-1, 305-2, ..., 305-n that are provided in the housing 310, a plurality of resistors R1, R2, ..., Rn, a plurality of switches SC1, SC2, SCn and a plurality of electrical lines 306-1, 306-2, ..., 306-n that each connect a respective switch SC1, SC2, SCn and a respective terminal 305-1, 305-2, ..., 305-n. The discharge circuit 304 is configured such that it is able to be connected to the energy storage module 100 such that in each case one resistor R1, R2, ..., Rn and one switch SC1, SC2, ..., SCn that are connected in series are connected in parallel with each energy storage cell EZ1, EZ2, ..., EZn.

In one embodiment, not shown, the discharge circuit 304, instead of the plurality of terminals 305-1, 305-2, ..., 305-n, may also have just one terminal to which the plurality of switches SC1, SC2, ..., SCn are connected such that they are each able to be activated separately.

The control unit 307 has a charge determination apparatus, not shown, that is configured so as to determine a respective absolute balancing requirement for each of the energy storage cells EZ1, EZ2, ..., EZn that is suitable, when the corresponding balancing is implemented successfully, for putting the energy storage module 100 into an energy-optimized balanced state. This determination takes place after the control unit 307 has received the corresponding information via the interface 301 from the voltage recording apparatus and the current recording apparatus of the monitoring electronics that the charging process was ended regularly and, in this respect, a variation of the energy storage cell voltages EZS1, EZS2, ..., EZSn at the time of completion of the CCCV charging process exceeds a predefined value, such that it is necessary to perform balancing with the aim of achieving an energy-optimized balance.

The charge determination apparatus in particular determines a relative amount of electric charge for each energy storage cell EZ1, EZ2, ..., EZn on the basis of the supplied information about a respective energy storage cell voltage EZS1, EZS2, ..., EZSn of each of the energy storage cells EZ1, EZ2, ..., EZn and the characteristic curve that gives a state of charge of a respective energy storage cell EZ1, EZ2, ..., EZn depending on a quiescent voltage of the respective energy storage cell EZ1, EZ2, ..., EZn and that was stored beforehand in the storage apparatus 302.

More precisely, the charge determination apparatus determines the relative amount of electric charge for each energy storage cell EZ1, EZ2, ..., EZn by inserting, instead of a respective quiescent voltage, the respective energy storage cell voltage EZS1, EZS2, ..., EZSn, measured following the completion of the charging process, which is formed from the quiescent voltage and a dynamic voltage, as parameter into the respective characteristic curve that gives the state of charge of the respective energy storage cell EZ1, EZ2, ..., EZn depending on the quiescent voltage of the respective energy storage cell EZ1, EZ2, ..., EZn, and defining the respective feedback value from this characteristic curve, that is to say a fictional state of charge of the respective energy storage cell EZ1, EZ2, ..., EZn, as the relative amount of electric charge.

In other words, the relative amount of electric charge, which is dimensionless and given as a percentage, corresponds to a state of charge that an energy storage cell EZ1, EZ2, ..., EZn would have if its quiescent voltage were to be the same as the energy storage cell voltage EZS1, EZS2, ..., EZSn measured following the completion of the charging process.

In order to improve the accuracy of the determination of the relative amount of electric charge, different characteristic curves that each give a state of charge of a respective energy storage cell EZ1, EZ2, ..., EZn depending on a quiescent voltage of the respective energy storage cell EZ1, EZ2, ..., EZn for different states of health are preferably stored in the storage apparatus 302. In this case, the charge determination apparatus is configured so as to receive the information about the state of health from the state of health determination apparatus or about the respective energy storage cell voltage EZS1, EZS2, ..., EZSn from the voltage recording apparatus, and to define the respective amount of electric charge as that value that corresponds to the state of charge in the respective characteristic curve associated with the corresponding state of health, which corresponds to the quiescent voltage that is identical to the energy storage cell voltage EZS1, EZS2, ..., EZSn measured following the completion of the charging process.

The control unit 307 furthermore has a balancing requirement calculation unit that is configured so as to determine a relative balancing requirement for each energy storage cell EZ1, EZ2, ..., EZn except for the energy storage cell EZ1, EZ2, ..., EZn for which the lowest relative amount of electric charge was calculated, that is to say the energy storage cell EZ1, EZ2, ..., EZn having the lowest energy storage cell voltage EZS1, EZS2, ..., EZSn, by calculating a difference between the relative amount of electric charge of a respective energy storage cell EZ1, EZ2, ..., EZn and the relative amount of electric charge of the energy storage cell EZ1, EZ2, ..., EZn for which the lowest relative amount of electric charge was determined.

Since the respective relative amounts of electric charge of the respective energy storage cells EZ1, EZ2, ..., EZn are given as a percentage, the respective relative balancing requirement, which is defined by the difference between two relative amounts of electric charge, is also given as a percentage.

If for example the relative amount of electric charge of a first of the energy storage cells EZ1, EZ2, ..., EZn is 98%, and the relative amount of electric charge of the energy storage cell EZ1, EZ2, ..., EZn for which the lowest relative amount of electric charge was calculated is 95%, then the relative balancing requirement of the first energy storage cell EZ1, EZ2, ..., EZn is 3%.

The balancing requirement calculation unit is furthermore configured so as to determine, using the respective current energy storage cell capacity that was determined by the charge determination apparatus on the basis of the state of health value that was transmitted by the state of health determination apparatus of the monitoring electronics of the energy storage module 100 to the interface 301, and an ideal value of the capacity or a nominal capacity of a respective energy storage cell EZ1, EZ2, ..., EZn that is stored for example in the storage apparatus 302, and the respective relative balancing requirement for each of the energy storage cells EZ1, EZ2, ..., EZn except for the energy storage cell EZ1, EZ2, ..., EZn for which the lowest relative amount of electric charge was calculated, an absolute balancing requirement, that is to say an amount of electric charge that needs to be drawn from these energy storage cells EZ1, EZ2, ..., EZn in order that all of the energy storage cells EZ1, EZ2, ..., EZn reach the state of the energy-optimized balance and thus all of the energy storage cells EZ1, EZ2, ..., EZn reach the upper voltage threshold value at the time of interruption of the subsequent CCCV charging.

The respective absolute balancing requirement is calculated in particular by multiplying the respective relative balancing requirement, in the above example 3%, that is to say 0.03, by the respective nominal capacity of the respective energy storage cell EZ1, EZ2, ..., EZn and by the state of health value, for example the SOH value. If the nominal capacity is given in the unit Ah, this value may possibly still have to be multiplied by 3600 in order to obtain a respective absolute balancing requirement in the unit As.

Following the completion of the determination of the respective absolute balancing requirement for the respective energy storage cells EZ1, EZ2, ..., EZn, these are stored in the storage apparatus 302 for subsequent balancing of the energy storage module 100.

In order to balance the energy storage module 100, a control apparatus of the control unit 307 is furthermore configured so as to activate the discharge circuit 304 such that the respective determined absolute balancing requirement is drawn from each energy storage cell EZ1, EZ2, ..., EZn except for the energy storage cell EZ1, EZ2, ..., EZn for which the lowest relative amount of electric charge was calculated.

The control unit 307 may in particular have a calculation unit that is configured so as to calculate a respective switching closure time for a respective energy storage cell EZ1, EZ2, ..., EZn on the basis of the respective determined absolute balancing requirement and further parameters, such as for instance the resistance of the respective resistor R1, Rn and the energy storage cell voltage EZS1, EZS2, ..., EZSn, which switching closure time is necessary to draw the respective determined absolute balancing requirement from the respective energy storage cell EZS1, EZ2, ..., EZn when the switch SC1, SC2, ..., SCn is closed. In this case, the control apparatus may be configured so as to activate the respective switches SC1, SC2, ..., SCn according to the calculated switching closure time, such that the respective switch SC1, SC2, ..., SCn is closed only in a time interval that is identical to the calculated switching closure time in order to bring about the discharging of the respective energy storage cell EZ1, EZ2, ..., EZn.

The respective absolute balancing requirement that comprises calculating the difference between the relative amount of electric charge of a respective energy storage cell EZ1, EZ2, ..., EZn and the relative amount of electric charge of the energy storage cell EZ1, EZ2, ..., EZn for which the lowest amount of electric charge was determined and that needs to be drawn from the respective energy storage cell EZ1, EZ2, ..., EZn in order to balance the energy storage module 100 is preferably determined or calculated in particular solely on the basis of direct measured variables, that is to say it is not necessary to access error-impacted estimated variables, such as for example the state of charge of a respective energy storage cell EZ1, EZ2, ..., EZn.

It is furthermore not necessary to wait for a quiescent state of the energy storage module 100 in order to calculate the respective absolute balancing requirement. Rather, the calculation both of the respective relative balancing requirement and of the absolute balancing requirement may take place directly after the end of the charging process of the energy storage module 100. It is thus not necessary to wait for any relaxation phases in comparison with the use of conventional devices for balancing an energy storage module or conventional balancing methods.

After the energy storage cells EZ1, EZ2, ..., EZn of the energy storage module 100 have been balanced using the device 300 according to the invention for balancing an energy storage module, the energy storage module 100 is able to be charged conventionally by way of a CCCV charging process using the charge controller.

Figure 4:
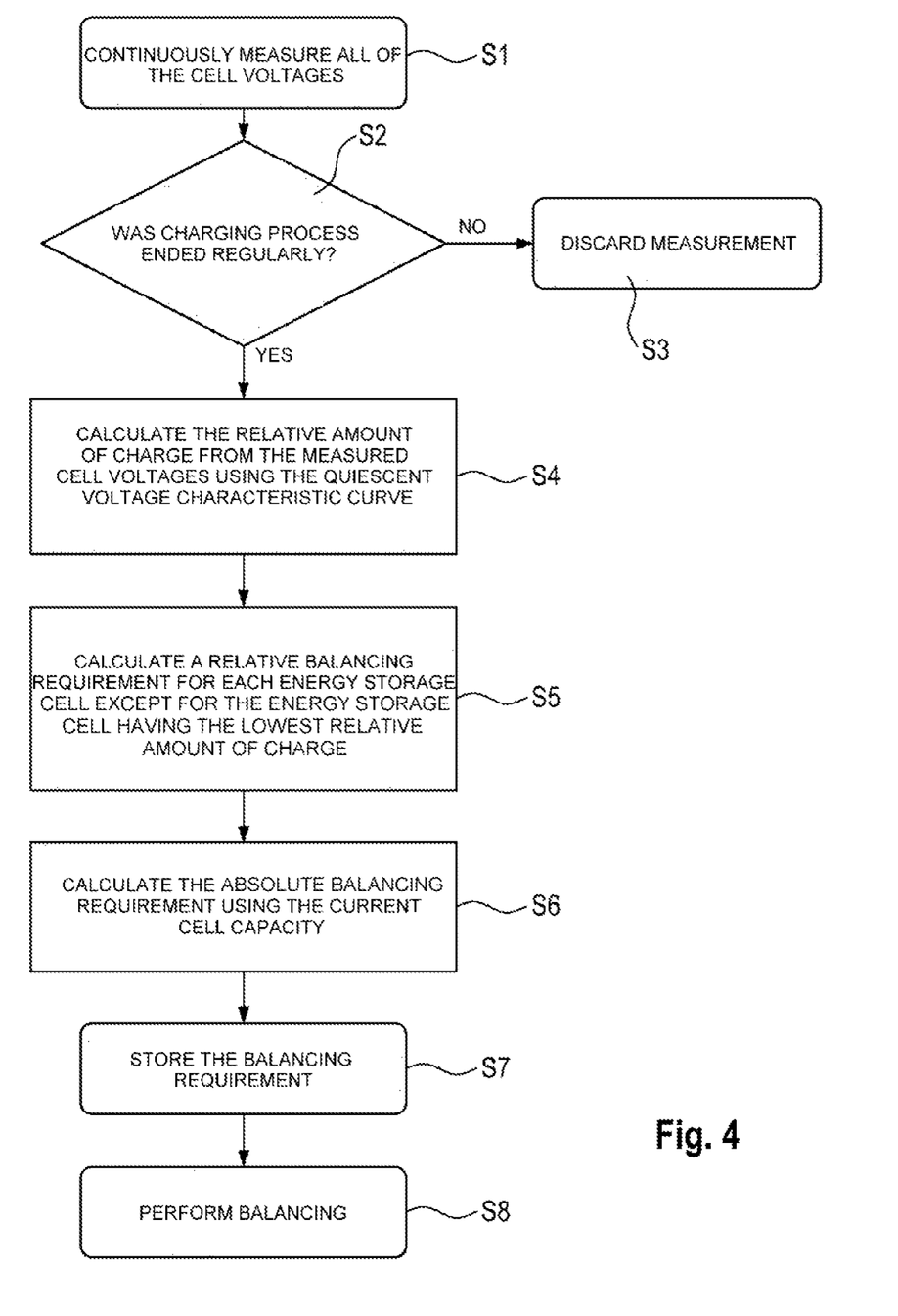
FIG. 4 shows a flowchart for illustrating a method according to the invention for balancing an energy storage module.

With reference to FIG. 4, a method for balancing an energy storage module 100 is described below.

The method may for example take place using the above-described energy storage module 100, the device 300 for balancing an energy storage module and the monitoring electronics for the energy storage module 100, which are connected to one another, in particular connected in terms of communication, as explained above.

In step S1, the respective energy storage cell voltages EZS1, EZS2, ..., EZSn of all of the energy storage cells EZ1, EZ2, ..., EZn are for example recorded or measured continuously during a CCCV charging method by way of the monitoring electronics.

It is determined at the same time whether the charging process was ended regularly. If it is determined that the charging process was not ended regularly (NO in step S2), the measurement in step S3 is discarded. If it is by contrast determined that the charging process was ended regularly (YES in step S2), the procedure moves on to step S4.

In step S4, a relative amount of electric charge for each energy storage cell EZ1, EZ2, ..., EZn is calculated from the respective energy storage cell voltage EZS1, EZS2, ..., EZSn and the quiescent voltage characteristic curve, that is to say the characteristic curve that gives a state of charge of a respective energy storage cell EZ1, EZ2, . . . , EZn depending on a quiescent voltage of the respective energy storage cell EZ1, EZ2, . . . , EZn, as described above, for example using the charge determination apparatus of the device 300.

In step S5, a relative balancing requirement is then determined for each energy storage cell EZ1, EZ2, . . . , EZn except for the energy storage cell EZ1, EZ2, . . . , EZn for which the lowest relative amount of electric charge was calculated, for example using the balancing requirement calculation unit, by calculating a difference between the relative amount of electric charge of a respective energy storage cell EZ1, EZ2, . . . , EZn and the relative amount of electric charge of the energy storage cell EZ1, EZ2, . . . , EZn for which the lowest relative amount of electric charge was calculated.

In step S6, an absolute balancing requirement, that is to say an amount of electric charge that needs to be drawn from these energy storage cells EZ1, EZ2, . . . , EZn so that these energy storage cells EZ1, EZ2, . . . , EZn reach the state of energy-optimized balance, and therefore all of the energy storage cells EZ1, EZ2, . . . , EZn reach the upper voltage threshold value at the time of interruption or a regular ending of a subsequent CCCV charging process, is then determined as described above for each energy storage cell EZ1, EZ2, . . . , EZn except for the energy storage cell for which the lowest relative amount of electric charge was calculated, based on a respective current energy storage cell capacity and the respective relative balancing requirement.

Following the completion of the determination of the respective absolute balancing requirement, the determination result is stored in step S7 for use in subsequent balancing.

In the subsequent balancing, in step S8, the energy storage module 100 is balanced, for example using the discharge circuit 304 described above, such that the respective determined absolute balancing requirement is drawn from a respective energy storage cell EZ1, EZ2, . . . , EZn.

Figure 5:
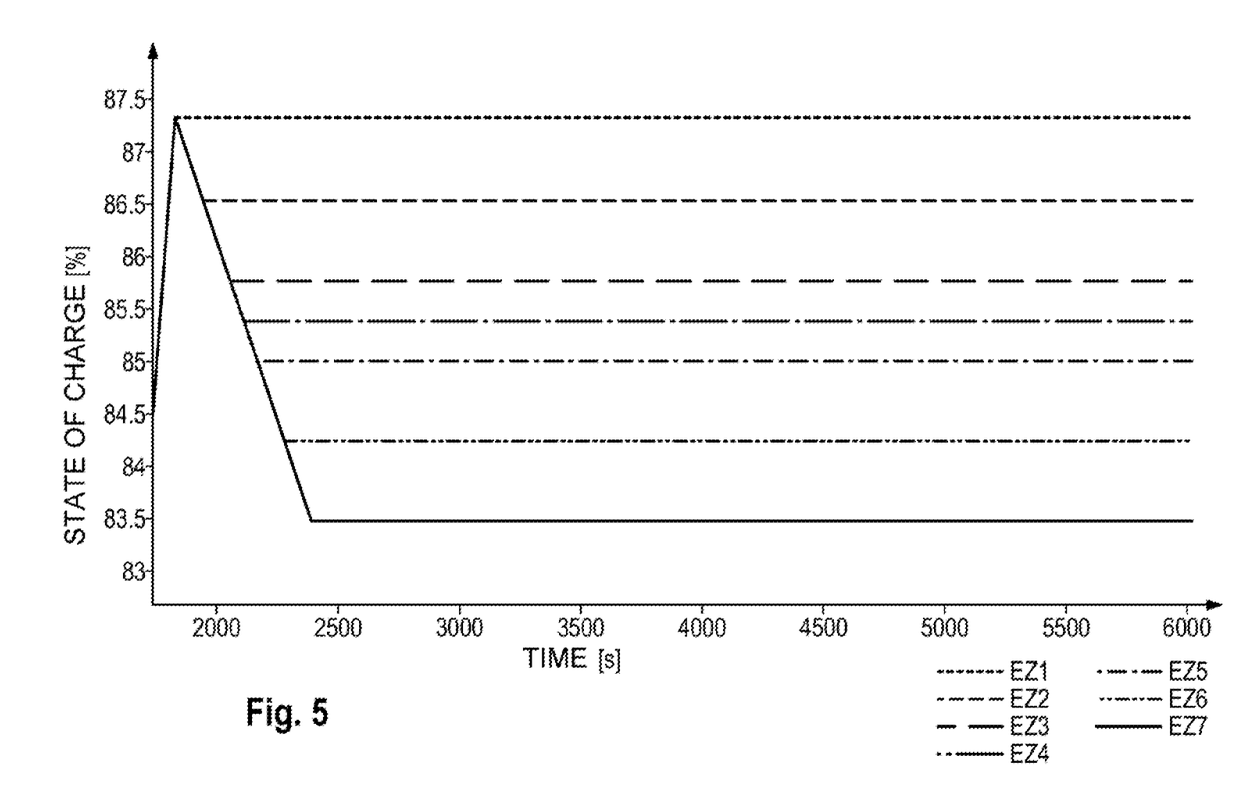
FIG. 5 shows a temporal profile of a state of charge of respective energy storage cells of an energy storage module that have been balanced in a dissipative manner using the method according to the invention for balancing the energy storage module.

FIG. 5 illustrates the temporal profile of the state of charge of seven energy storage cells EZ1, EZ2, . . . , EZ7 of an energy storage module 100 that are connected in series and have been balanced in a dissipative manner using the method according to the invention for balancing the energy storage module or the device 300 according to the invention for balancing an energy storage module. As is apparent from FIG. 5, the state of charge of a respective energy storage cell is virtually constant in the temporal profile, wherein the states of charge of the individual energy storage cells EZ1, EZ2, . . . , EZ7 lie in the region of approximately 83.4% to approximately 87.3% and therefore exhibit a large deviation. If by contrast the energy storage module were to be balanced before the charging process using a conventional balancing method, then the respective states of charge and therefore also the energy storage cell voltages would be virtually identical in the relaxed state, even though these are considerably different directly after the charging process due to the restriction of the charging by the cell having the highest cell impedance.

By virtue of the balancing according to the invention and the subsequent charging process, the amount of charge that is able to be drawn from the individual energy storage cells is still the same as if the energy storage module were to have been balanced and then charged by the conventional balancing method, but the average value of the state of charge of the energy storage cells is higher, such that a greater amount of energy is able to be drawn.

Figure 6:
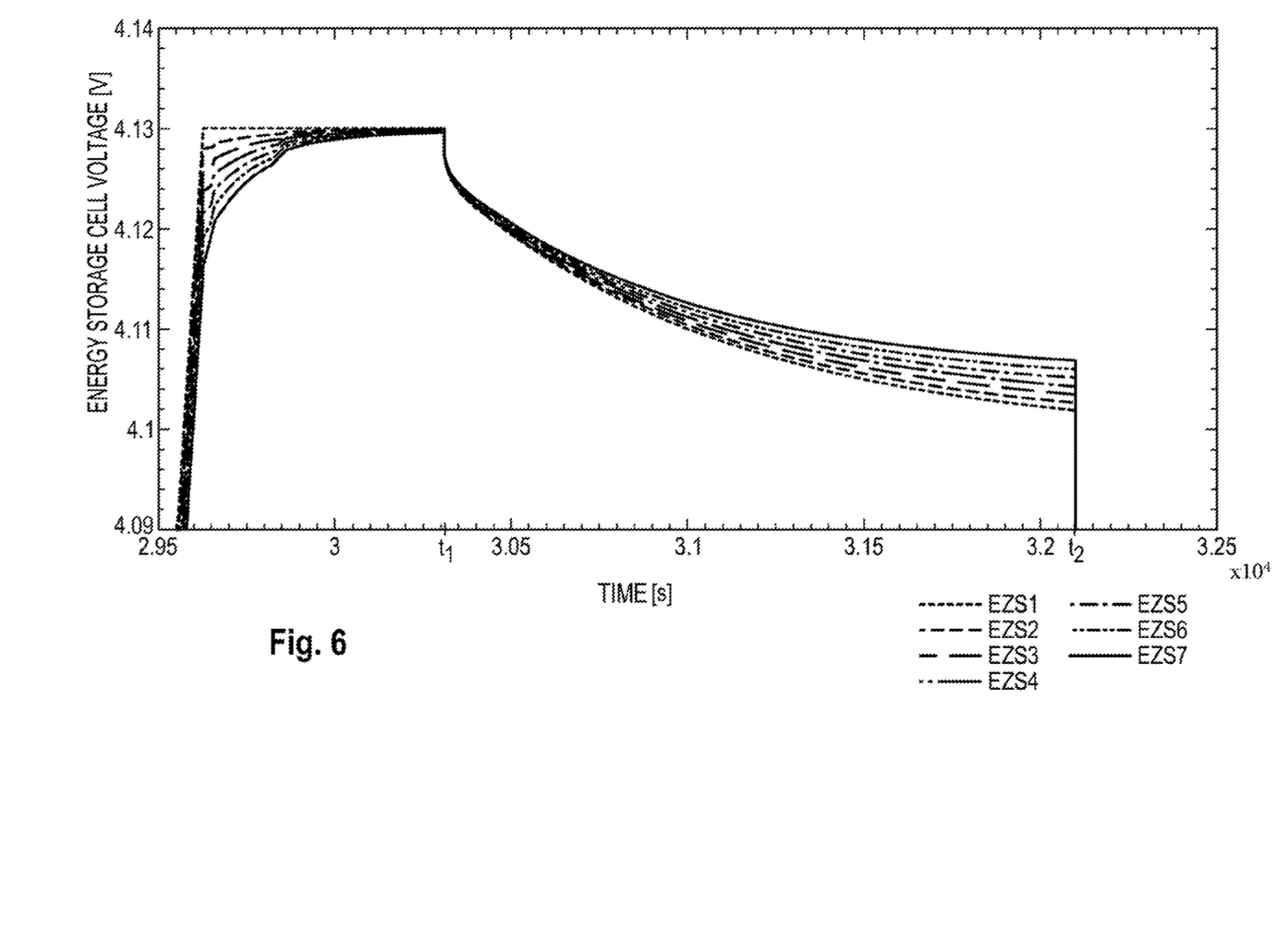
FIG. 6 shows a temporal profile of voltages of respective energy storage cells of an energy storage module during a charging process and subsequent relaxation, after performing the method according to the invention for balancing the energy storage module.

FIG. 6 illustrates a temporal profile of energy storage cell voltages EZS1, EZS2, . . . , EZS7 of respective energy storage cells EZ1, EZ2, . . . , EZ7 of an energy storage module 100 during a CCCV charging process and subsequent relaxation, after performing the method according to the invention for balancing the energy storage module. As is apparent from FIG. 6, all of the energy storage cells EZ1, EZ2, . . . , EZ7 have a virtually identical voltage, which corresponds to the upper voltage threshold value, at the time $t_1$ at the end of the charging process. In contrast to the charging following a conventional balancing method, the energy storage cell EZ1, EZ2, . . . , EZn having the highest impedance now no longer restricts all of the other energy storage cells EZ1, EZ2, . . . , EZn in the series string from reaching the highest possible voltage level. As is apparent from FIG. 6, after the CCCV charging is switched off at the time $t_1$, the energy storage cell voltages EZS1, EZS2, . . . , EZS7 relax to different voltage levels that reflect the difference between the balancing according to the invention and the balancing condition from the prior art. These quiescent voltages of the energy storage cells EZ1, EZ2, . . . , EZn at the time $t_2$ following balancing according to the invention are in this case higher than following comparable CCCV charging of a conventionally balanced energy storage module. The state of the energy storage module 100 at the time $t_2$ thereby permits subsequent drawing of the maximum possible amount of energy.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A device for balancing an energy storage module that has a plurality of series-connected energy storage cells, comprising:
an interface that is configured so as to communicate with monitoring electronics of the energy storage module, wherein
the interface communicates with a voltage recording apparatus of the monitoring electronics in order to receive information about a respective energy storage cell voltage of each of the energy storage cells from the voltage recording apparatus, and
the interface communicates with the voltage recording apparatus and a current recording apparatus of the monitoring electronics in order to receive information about regular ending of charging of the energy storage module;
a charge determination apparatus that is configured, following reception of the information about the regular ending of the charging of the energy storage module, to determine a relative amount of electric charge for each energy storage cell, wherein
the relative amount of electric charge for each energy storage cell is determined on a basis of the information about the respective energy storage cell voltage of the respective energy storage cell following the regular ending of the charging of the energy storage module and on a basis of a characteristic curve that gives a state of charge of the respective energy storage cell depending on a quiescent voltage of the respective energy storage cell, and
the respective energy storage cell voltage of the respective energy storage cell is formed from the quiescent voltage of the respective energy storage cell and a dynamic voltage of the respective energy storage cell;

a processor comprising a balancing requirement calculation unit that is configured, for each energy storage cell except for the energy storage cell for which a lowest relative amount of electric charge was determined, so as to determine a respective relative balancing requirement by calculating a difference between the relative amount of electric charge of the respective energy storage cell and the respective amount of electric charge of the energy storage cell for which the lowest relative amount of electric charge was determined and, on the basis of the respective relative balancing requirement and a respective capacity of each of the energy storage cells, to determine a respective absolute balancing requirement for each energy storage cell except for the energy storage cell for which the lowest relative amount of electric charge was determined;

a discharge circuit that is configured so as to be connected to the energy storage module such that the respective energy storage cell is able to be discharged separately by way of the discharge circuit; and a control apparatus that is configured so as to activate the discharge circuit such that the respective determined absolute balancing requirement is drawn from each energy storage cell except for the energy storage cell for which the lowest relative amount of electric charge was determined.

2. The device for balancing an energy storage module according to claim 1, wherein
the charge determination apparatus is configured to:
define that value of the state of charge that is associated with the respective energy storage cell voltage in the characteristic curve as respective relative amount of charge of the respective energy storage cell, and
determine the respective absolute balancing requirement by multiplying the respective determined relative balancing requirement by the respective capacity.

3. The device for balancing an energy storage module according to claim 1, wherein
the interface is configured so as to communicate with a state of health determination apparatus of the monitoring electronics in order to receive information about a respective state of health of the respective energy storage cell from the state of health determination apparatus, and
the balancing requirement calculation unit is configured so as to calculate the capacity of the respective energy storage cell on the basis of the information about the state of health of the respective energy storage cell and a nominal capacity of the respective energy storage cell.

4. The device for balancing an energy storage module according to claim 3, further comprising:
a storage apparatus in which the characteristic curve that gives the state of charge of the respective energy storage cell depending on the quiescent voltage of the respective energy storage cell is stored.

5. The device for balancing an energy storage module according to claim 4, wherein
a plurality of different characteristic curves that each give the state of charge of the respective energy storage cell depending on the quiescent voltage of the respective energy storage cell for different states of health of the respective energy storage cell are stored in the storage apparatus,
the charge determination apparatus is configured so as to determine the respective relative amount of electric charge on the basis of the information about the respective energy storage cell voltage of each of the energy storage cells following the regular ending of the charging of the energy storage module and that characteristic curve that corresponds to the respective state of health.

6. The device for balancing an energy storage module according to claim 1, wherein
the discharge circuit has a plurality of resistors and a plurality of switches and is configured so as to be connected to the energy storage module such that a respective resistor and a respective switch that are connected in series are connected in parallel with the respective energy storage cell, and
the processor further comprises a calculation unit that is configured so as to calculate a respective switching closure time for the respective energy storage cell on the basis of the respective determined absolute balancing requirement, which switching closure time is necessary to draw the respective determined absolute balancing requirement from the respective energy storage cell when the switch is closed, and the control apparatus is configured so as to activate the respective switch according to the calculated switching closure time.

7. A motor vehicle, comprising:
an energy storage module that has a plurality of series-connected energy storage cells and monitoring electronics; and
a device for balancing the energy storage module according to claim 1.

8. The motor vehicle according to claim 7, wherein
the motor vehicle is an electric or hybrid vehicle.

9. A method for balancing an energy storage module that has a plurality of series-connected energy storage cells, comprising:
recording a respective energy storage cell voltage of each of the energy storage cells;
recording a respective capacity of each of the energy storage cells;
determining regular ending of charging of the energy storage module;
determining a respective relative amount of electric charge for each energy storage cell on a basis of the recorded respective energy storage cell voltage of the respective energy storage cell following the regular ending of the charging of the energy storage module and on a basis of a characteristic curve that gives a state of charge of the respective energy storage cell depending on a quiescent voltage of the respective energy storage cell, wherein the respective energy storage cell voltage of the respective energy storage cell is formed from the quiescent voltage of the respective energy storage cell and a dynamic voltage of the respective energy storage cell;
determining a respective relative balancing requirement by calculating a difference between the relative amount of electric charge of the respective energy storage cell and the relative amount of electric charge of the energy storage cell for which the lowest relative amount of electric charge was determined, for each energy storage cell except for the energy storage cell for which the lowest relative amount of electric charge was determined;

determining a respective absolute balancing requirement on the basis of the respective relative balancing requirement and the respective capacity of each of the energy storage cells for each energy storage cell except for the energy storage cell for which the lowest relative amount of electric charge was determined; and discharging the energy storage module such that the respective determined absolute balancing requirement is drawn from each energy storage cell except for the energy storage cell for which the lowest amount of electric charge was determined.

10. The method for balancing an energy storage module according to claim 9, wherein
the value of the state of charge that is associated with the respective energy storage cell voltage in the characteristic curve is defined as respective relative amount of charge of the respective energy storage cell, and the respective absolute balancing requirement is determined by multiplying the respective determined relative balancing requirement by the respective capacity.

11. The method for balancing an energy storage module according to claim 9, further comprising:
recording a respective state of health of the respective energy storage cell; and
calculating the capacity of a respective energy storage cell on the basis of the respective state of health of the respective energy storage cell and a nominal capacity of the respective energy storage cell.

12. The method for balancing an energy storage module according to claim 11, further comprising:
acquiring the characteristic curve that gives the state of charge of the respective energy storage cell depending on the quiescent voltage of the respective energy storage cell; and
storing the acquired characteristic curve in a storage apparatus.

13. The method for balancing an energy storage module according to claim 12, wherein
a plurality of different characteristic curves that each give the state of charge of the respective energy storage cell depending on the quiescent voltage of the respective energy storage cell for different states of health of the respective energy storage cell are stored in the storage apparatus, and
the respective relative amount of electric charge is determined on the basis of the respective energy storage cell voltage of each of the energy storage cells following the regular ending of the charging of the energy storage module and that characteristic curve that corresponds to the respective state of health.

14. The method for balancing an energy storage module according to claim 9, further comprising:
providing a discharge circuit that has a plurality of resistors and a plurality of switches;
connecting the discharge circuit to the energy storage module such that a respective resistor and a respective switch that are connected in series are connected in parallel with the respective energy storage cell;
calculating a respective switching closure time for the respective energy storage cell on the basis of the respective determined absolute balancing requirement, which switching closure time is necessary to draw the respective determined absolute balancing requirement from the respective energy storage cell when the switch is closed; and
activating the respective switch according to the calculated switching closure time.

* * * * *